Feb. 4, 1941. H. W. WISE 2,230,369
LENS FOR GOGGLES
Filed March 30, 1938

INVENTOR.
Henry W. Wise
BY Earl F Chappell
ATTORNEYS

Patented Feb. 4, 1941

2,230,369

UNITED STATES PATENT OFFICE 2,230,369

LENS FOR GOGGLES

Henry W. Wise, Flint, Mich.

Application March 30, 1938, Serial No. 198,929

9 Claims. (Cl. 88—54)

This invention relates to improvements in lenses for goggles.

The main objects of my invention are:

First, to provide a new and improved lens for goggles such as are used by electric welders, workers in metal and other substances, etc., the said lens being treated to render the same impervious to or to prevent injury by particles of molten metal or other substance striking the same during the welding or other operation.

Second, to provide a lens of the type described having a novel and improved protective coating of a readily removable and renewable substance.

Third, to provide a lens or other transparent optical member coated with a transparent substance serving to protect the same from particles of hot or molten metal.

Further objects relating to details and economies of my invention will definitely appear from the description to follow. The invention is defined in the claims.

A structure embodying the features of my invention is illustrated in the accompanying drawing, wherein:

Fig. 1 is a perspective view illustrating goggles such as are ordinarily worn by welders, grinders, and the like to protect their eyes while working.

Figure 1:
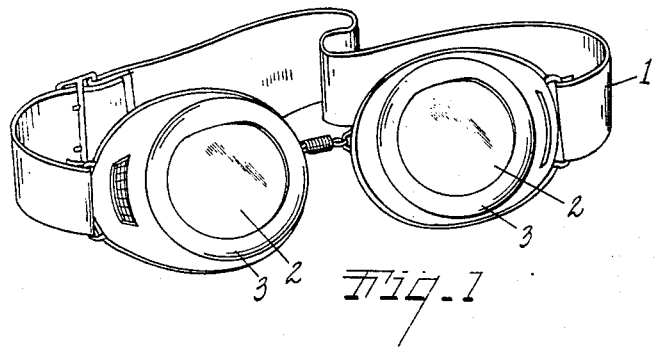
Figure 2:
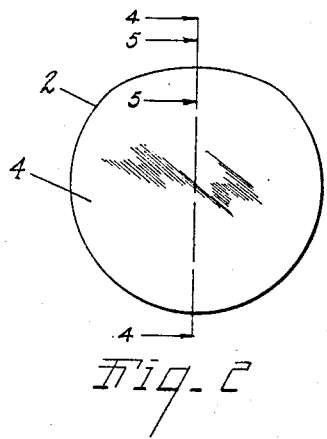
Fig. 2 is a front view illustrating a lens for such a goggle after being treated by the method of my invention and after the same has been used.
Figure 3:
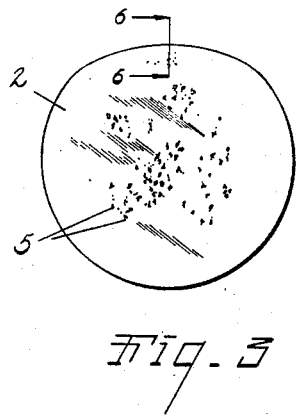
Fig. 3 is a view similar to Fig. 2, of an untreated lens after it has been subjected to the particles or sparks of molten or hot metal evolved during a welding or grinding operation.
Figure 4:
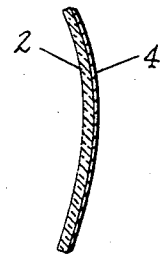

Fig. 4 is a view in section on line 4—4 of Fig. 2, more clearly illustrating the structure of my invention, no attempt having been made to maintain exact proportioning of the parts.

Figure 5:
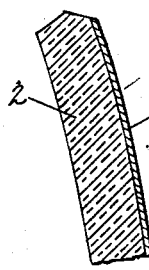

Fig. 5 is an enlarged fragmentary view in section on a line corresponding to line 5—5 of Fig. 2, illustrating a treated lens after use and demonstrating how the coating protects the glass of the lens.

Figure 6:
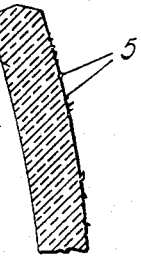

Fig. 6 is a view similar to Fig. 5, illustrating an untreated lens after being subjected to a shower of sparks or hot metal.

The present invention relates to a lens such as is employed in goggles ordinarily worn by welders while working, to protect their eyes from the hot sparks of metal evolved during the welding operation. These goggles are usually quite thick and are ordinarily colored amber or another suitable color to protect the eyes of the wearer from glare. Considerable difficulty has heretofore been experienced due to the fact that the said hot sparks are of course at a temperature much higher than the melting point of the glass of the goggles, and consequently embed themselves in the glass, with the result that metal particles are soon deposited on the surface of the glass, impairing or even completely obscuring the vision of the wearer.

In the past it has been customary to remove this film or deposit of metal particles by grinding. However, it is only possible to regrind the lenses a few times, when they must be discarded. Furthermore, the grinding operation is an expensive one. By my invention I provide for coating the outer surface of the glass with a thin protective film of a substance having a melting point substantially higher than the melting point of the glass of the lens and characterized by substantially lower heat conductivity, the film thereby constituting a protective coating to receive the sparks or particles of molten metal and to dissipate the heat thereof sufficiently to prevent embedding thereof in the glass or film.

Referring to the drawing, the reference numeral 1 indicates in general a pair of goggles such as are worn by electric arc welders, grinders, and the like to shield their eyes from glare and the shower of sparks or particles of molten material attendant on a welding or like operation. These goggles are provided with lenses 2 carried in suitable mountings 3. It is the treatment of these lenses which constitutes the essential feature of my invention.

This treatment consists in the application of a protective coating or film 4 of a suitable soluble substance having a relatively high melting point and a relatively low heat conductivity. In practice I find a sodium silicate solution admirably well suited to this purpose, in view of the fact that the melting point of the sodium silicate is 1018° C. or approximately 1864° F., whereas the melting point of the glass is between 1400° and 1600° F., and also because it is readily soluble in water. Furthermore, sodium silicate has about 25% less conductivity of heat than glass. The solution preferably consists of sodium silicate reduced or thinned approximately 5% with a strong lye or caustic solution. The strength of the solution, of course, may vary according to the viscosity of the sodium silicate.

The coating or film 4 is applied by any procedure which will insure that an even film results. In practice I have discovered that the coating may be effectively deposited by rotating the lens about an axis normal to the center thereof while dropping or flowing the solution onto the center of the lens and allowing the same to spread outwardly by centrifugal force. The lens is mounted for rotation in a suitable chuck or suction cup and the speed of rotation is readily determinable in practice and will of course depend upon the degree of convexity of the surface of the lens. I have found that by employing apparatus such as described a very uniform film or coating results.

The speed of rotation of the lens for best application of coating 4 is variable, depending on the consistency of the solution employed and the room temperature. The solution is preferably placed on the center of the lens while the latter is moving, by means of a dropper or other container, and is uniformly pulled out or flattened by centrifugal force. This force may of course be varied to thereby determine the thickness of the layer by varying the speed of rotation of the lens. For example, to deposit the coating on a flat lens requires a greater speed of rotation of the latter than in the case of a convex lens.

The said coating is allowed to dry and the lens is then ready for assembly in the goggle mounting 3. In practice, I find that the coating completely prevents the particles or sparks of molten or hot metal from reaching and embedding themselves in the glass of the lens 2. Furthermore, because of the relatively low conductivity and high melting point of the sodium silicate, the film 5 greatly inhibits the tendency of the particles to embed themselves even in the film and it has been found in practice that only rarely do a few particles 5 become embedded in coating 4.

If a sufficient deposit of these metal particles occurs to objectionably affect the visibility or transparency of the lens, the coating 4 is readily removed by dissolving the same with water, thus removing the particles 5 embedded therein. The coating may then be renewed by a similar process to that described above. This procedure of removing and renewing successive coatings as the same become objectionably covered with metal particles may of course be carried on any number of times, however the coated lenses need be treated much less often than in the case the coating is omitted.

In Fig. 6 I illustrate a lens identically similar to that illustrated in Fig. 5, except that it has not been treated to provide the protective film of my invention. It will be noticed that the deposit of particles 5 is embedded in the glass itself, thus making it necessary that, if the glass is to be used further, the lens be completely reground. My improved glass eliminates all this by substituting for the exposed surface of the glass a protective surface having a sufficiently high melting point that although the molten particles are received and embedded therein in comparatively rare instances, and in all cases the same are sufficiently cooled for the most part that they do not become embedded even in the film. Of course, it will be understood that the hot or molten sparks of metal are at a temperature higher even than the melting point of the sodium silicate which I preferably employ. However, as stated, I find that the latter is sufficiently resistant to the heat of the metal and sufficiently low in heat conductivity to inhibit to a very substantial extent the objectionable tendency of the metal to embed itself.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A lens for goggles and the like which is impervious to pitting, erosion or permanent obscuring by hot molten particles evolved in welding and the like, comprising a convex ground glass element having a uniformly thick coating of sodium silicate on the convex surface thereof, said coating being in dry condition and serving to protect said convex surface from hot or molten metal particles impinged on the coating.

2. A lens for goggles and the like which is impervious to pitting, erosion or permanent obscuring by hot molten particles evolved in welding and the like, comprising a transparent element having a uniformly thick coating of sodium silicate on a surface thereof, said coating being in dry condition and serving to protect said surface from hot or molten metal particles impinged on the coating.

3. A lens for goggles and the like which is impervious to pitting, erosion or permanent obscuring by hot molten particles evolved in welding and the like, comprising a convex element having a uniformly thick film of a readily soluble, heat resistant protective substance adhesively united to a surface thereof, said film serving to protect said surface from hot or molten metal such as is evolved during welding.

4. A lens structure for welders' goggles which is impervious to pitting, erosion or permanent obscuring by hot molten particles evolved in welding and the like, comprising a convex transparent lens member and a uniformly thick coating of a water soluble material having a higher melting point than the lens, said coating being applied to the convex surface of the lens member and serving to protect the same from damage by hot molten metal particles impinged on the coating.

5. A lens structure for welders' goggles which is impervious to pitting, erosion or permanent obscuring by hot molten particles evolved in welding and the like, comprising a transparent lens member and a uniformly thick coating of a water-soluble material having a relatively high melting point adhesively connected to the member, said coating serving to protect the member from damage by hot metal particles impinged on the coating and being readily soluble to remove the same from the lens member in the event that such particles become embedded therein.

6. A lens structure for welders' goggles which is impervious to pitting, erosion or permanent obscuring by hot molten particles evolved in welding and the like, comprising a transparent member and a film of a material having a higher melting point than the material of the member, said film being applied to a surface of the member and serving to protect the same from damage by hot metal striking the same.

7. A lens for welders' goggles which is impervious to pitting, erosion or permanent obscuring by hot molten particles evolved in welding and the like, comprising a transparent member having a uniformly thick film of sodium silicate applied and adhesively connected to the outer surface thereof.

8. A lens for welders' goggles and the like comprising a transparent member having a uniformly thick film of a protective substance applied to a surface thereof, said substance being readily soluble in water to remove the same.

9. A lens for welders' goggles and the like comprising a transparent member having a film of a protective substance applied to a surface thereof, said substance being readily soluble to remove the same for application of another similar film.

HENRY W. WISE.